Figure 1:
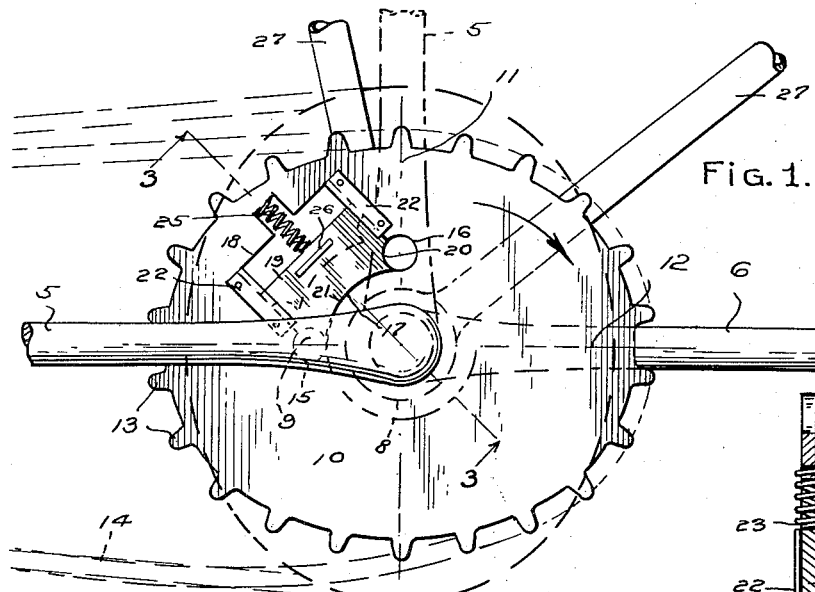

Nov. 2, 1954     C. PAYBERG ET AL     2,693,119
CHANGE SPEED SPROCKET FOR BICYCLES
Filed Jan. 30, 1953

*INVENTORS*
CARL PAYBERG
BY WALTER H. JOHNSTON,

*ATTORNEY.*

2,693,119
Patented Nov. 2, 1954

2,693,119

CHANGE SPEED SPROCKET FOR BICYCLES

Carl Payberg, Hollywood, and Walter H. Johnston, Fort Lauderdale, Fla.

Application January 30, 1953, Serial No. 334,202

5 Claims. (Cl. 74—594.2)

This invention relates to an improvement in a power and speed changing mechanism and has particular reference to an improved power sprocket for bicycles or the like.

Elliptical sprockets are well known in the art as applied to bicycles and other mechanisms and it is an object of this invention to provide a simple and inexpensive latch device associated with the sprocket whereby the crank shaft of the conventional pedal cranks may be quickly and easily shifted so as to impart a driving connection between the cranks and the drive sprocket on either the minimum or maximum axis of the sprocket without the use of screws, bolts or similar devices or without the use of more or less complicated and expensive clutch mechanisms.

The invention contemplates the use of a simple slidable latch that is shiftable within an opening formed in the sprocket in such manner that by an easy sliding motion, the conventional lateral lug formed upon one pedal crank may be shifted to a selected socket and latched in the adjusted position to impart its power drive to the sprocket on either the minimum or maximum axes of the sprocket. It should be here stated for information of those unfamiliar with the use of the elliptical sprocket, that when the driving lug of the crank is located on the axis of the larger diameter of the sprocket, the resultant drive very considerably increases the speed of the driven or rear wheel of a bicycle due to the leverage imparted to what, in effect constitutes a sprocket of larger diameter and when the driving lug is positioned on the axis of the sprocket of smallest diameter, the resultant drive will be slower, but of considerably greater power due to the increased leverage upon what, in effect constitutes a sprocket of smaller diameter, enabling a rider to traverse a very considerable incline without an exceptional effort.

Novel structural details and mode of operation will be more clearly understood, by reference to the following specification, coupled with the accompanying drawings, wherein has been illustrated a preferred form of the invention and wherein like characters of reference are employed to denote like parts throughout.

Figure 2:
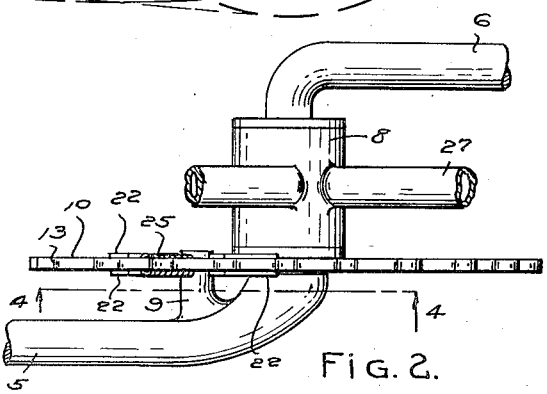
Figure 3:
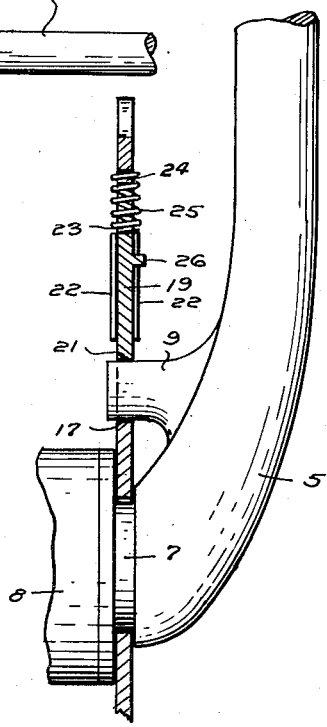
Figure 4:
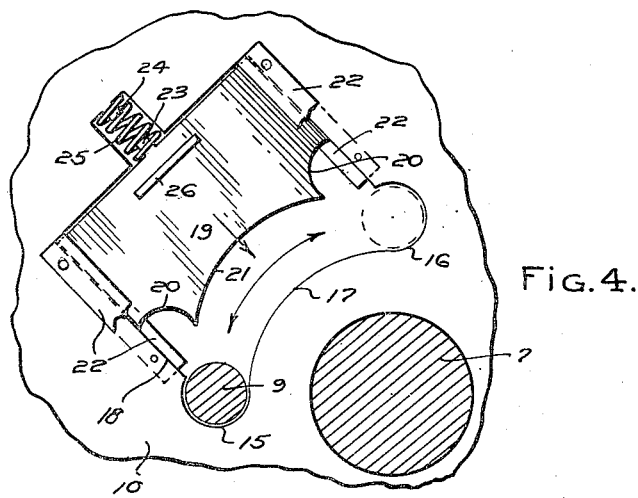

In the drawings:

Figure 1 is a side elevation of a sprocket and associated mechanism constructed in accordance with the invention, with the parts shown in the speed driving position, Figure 2 is a top plan view thereof, Figure 3 is an enlarged transverse section, taken on line 3—3 of Figure 1, parts shown fragmentarily and, Figure 4 is an enlarged fragmentary section, taken on line 4—4 of Figure 2.

Referring specifically to the drawings, the numerals 5 and 6 designate a pair of oppositely extending pedal cranks of conventional construction, having a connecting shaft 7, journalled in suitable and well known bearings positioned in a bearing housing 8, all of well known form. The crank 5 is, for purposes of illustration, located upon the right hand side of the bicycle, which is the usual location in most well known types of vehicles. The crank 5 carries an integral cylindrical lug 9, commonly employed to engage in a suitable opening formed in the conventional circular sprocket.

Positioned upon the shaft 7 adjacent one end of the housing 8 and held against displacement by an enlarged portion of the crank 5, is an elliptical sprocket 10, having a minimum diameter 11 and a maximum diameter 12. The sprocket is provided with circumferentially spaced sprocket teeth 13 for driving engagement with a conventional sprocket chain 14, shown in dotted lines. The chain 14 in turn drives a small sprocket upon the shaft of a rear driven wheel, not shown, in the usual manner. The chain has a length sufficient to compensate for the maximum diameter of the sprocket 10 when the sprocket is shifted to the position of dotted lines shown in Figure 1, with the chain being alternately taut and loose.

Since it is contemplated that the crank 5 and its lug 9 shall be disposed on the axis of either the smallest or the largest diameter of the sprocket, it follows that means must be provided to positively position such lug in either of the selected positions against accidental shifting in use, and to provide for this contingency, the sprocket has been cut away to form arcuate sockets 15 and 16, here shown as being semi-cylindrical with the axial center of each socket being spaced outwardly an identical distance from the axial center of the sprocket, with the socket 15 being directly centered upon the axis of greatest diameter, and the socket 16 being directly centered upon the axis of smallest diameter of the sprocket. The sockets have a diameter slightly larger than the diameter of the lug 9 whereby the lug will freely seat in either of the sockets. The sockets are connected by an arcuate trackway 17. The sockets communicate with a large generally rectangular opening 18, slidably receiving a latch plate 19, two corners of which are arcuately cut away at 20 to form in effect a continuation of the sockets 15 and 16. The lower edge of the plate 19 is arcuately cut away upon an arc corresponding to the arc of the trackway, as at 21. The plate 19 has a thickness identical with the thickness of the sprocket 10 and is flush with the inner and outer sides of the sprocket. Retaining plates 22, riveted or otherwise attached to the opposite faces of the sprocket to partially overlie the ends of the plate 19, serve to maintain the plate 19 within the opening 18 and to permit it to freely slide toward and from the trackway 17. The upper edge of the plate 19 is provided with a lug 23 and the opening 18 is extended at its upper end centrally thereof and is provided with a lug 24, axially aligned with the lug 23. A compression spring 25 engages the lugs 23 and 24 and serves to urge the plate 19 to a position of seating engagement with the trackway 17. Any desirable means may be employed to facilitate the shifting of the plate 19 against the tension of the spring 25, here illustrated as a finger engaging rib 26. The plate when released normally shifts to a point where the arcuate edge 21 contacts the trackway 17, in which position, the arcuate notches 20 form, with the sockets 15 and 16, cylindrical sockets that will securely prevent the shifting of the lug 9 with respect to the sprocket. The sockets 15 and 16 and the opening 18 and its extension are cut entirely through the sprocket, as clearly shown. Fragmentary portions of the vehicle frame 27 are shown in Figures 1 and 2.

The center line of the opening 18 is arranged on an angle of forty-five degrees with respect to the minimum and maximum axis of the sprocket and the opening extends to either side of the center line an identical distance. The sockets are ninety degrees apart. The improved sprocket 10 and associated parts may be easily and quickly substituted for the conventional circular sprockets now in use, by simply removing the cranks and their connecting shaft, removing the old sprocket and substituting the sprocket 10, after which the parts are reassembled.

The use of the device is as follows:

Assuming the parts to be in the position shown in Figures 1, 2 and 4, the drive is in the direction of the arrow in Figure 1. The latch plate 19 has been shifted to its latching position under the influence of the spring 25 and the lug 9 is securely latched in the socket 15 upon the axis of greatest diameter 12 of the sprocket 10. The pedal crank 5 is now securely connected in driving engagement with the sprocket for imparting a speed drive, such as will be desirable when the rider is traversing a substantially level area. Upon relatively inclined roadways, when power is desired, the rider may reach down and shift the plate 19 outwardly by the rib 26 and against the tension of the spring 25 permitting the pedal 5 and its lug 9 to shift to the opposite socket 16. Upon release, the latch plate 19 will immediately shift to the latching position to maintain the lug and the pedal in the power driving position. When again approaching a level roadway and speed is desired, the rider again shifts the plate 19 and reverses the motion of the pedal 5 to cause the lug 9 to shift to the socket 15, where it is again latched in position for the speed drive.

It will be apparent from the foregoing, that an extremely simple and highly effective latch means has been associated with an elliptical sprocket to quickly and easily convert the sprocket drive from a power to a speed drive with a minimum of effort. The parts are few and simple are cheap to manufacture, are strong, durable, require little or no attention and provide a very desirable universal drive for bicycles or the like.

While a preferred form of the device has been illustrated, changes are contemplated as readily fall within the spirit of the invention or the scope of the subjoined claims.

Having described our invention, what we claim as new and desire to secure by Letters Patent is:

1. A change speed drive means for bicycles, the combination with an elliptical drive sprocket for driving a sprocket chain, and a pedal crank having a pedal shaft for the support of the sprocket, a lug carried by the crank for shiftably positioning the crank in driving connection with the sprocket, a latch carried by the sprocket to control the shifting movement of the lug with respect to the sprocket, the latch positioning the crank in one position to parallel the center line of the sprocket at its greatest diameter, the latch also serving to position the crank in a shifted position to parallel the center line of the sprocket at its smallest diameter, and means whereby the latch is shiftable into and out of the line of shifting movement of the lug.

2. The device as in claim 1, wherein the lug projects through an opening formed in the sprocket, sockets formed in the sprocket for the seating reception of the lug in either position of adjustment, the latch being shiftable to permit the shiftable adjustment of the lug to be seated in either of the sockets.

3. A change speed drive means for bicycles, the combination of an elliptical driving sprocket and a pedal crank, the crank provided with an inwardly extending lug that projects through an opening formed in the sprocket, the opening of the sprocket being elongated and shaped to provide sockets at either end, the axial center line of one socket being on the center line of the greatest diameter of the sprocket, the axial center line of the other socket being on the center line of the smallest diameter of the sprocket, a shiftable latch plate carried by the sprocket, the crank lug being shiftable in the opening for seating engagement in either of the sockets, the latch plate being shiftable into and out of the line of movement of the lug, the latch plate when in one position serving to retain the lug seated in a selected socket, the latch plate when in another position permitting the lug to be shifted for seating engagement in the opposite socket, the shifting of the lug from one socket to another serving to position the crank parallel with the center line of either the greatest or the smallest diameter of the sprocket and spring means for urging the latch plate to a latching position.

4. The device as in claim 3, wherein the latch plate is shiftable in the opening formed in the sprocket and with the latch plate flush with both the inner and outer sides of the sprocket and retaining means to support the latch plate against displacement in the opening.

5. The device as in claim 3, wherein the sockets are semi-circular and with the opposite corners of the latch plate provided with semi-circular notches to register with the sockets when the plate is in latching position to jointly form cylindrical sockets, the lug being cylindrical to correspond to the cylindrical sockets.

References Cited in the file of this patent

UNITED STATES PATENTS

| Number | Name | Date |
|---|---|---|
| 513,589 | Metz | Jan. 30, 1894 |
| 530,058 | Schaum | Nov. 27, 1894 |
| 621,925 | Kolb | Mar. 28, 1899 |
| 2,522,779 | Culkosky | Sept. 19, 1950 |
| 2,648,996 | MacDougall | Aug. 18, 1953 |

FOREIGN PATENTS

| Number | Country | Date |
|---|---|---|
| 326,458 | Italy | May 23, 1935 |
| 358,894 | Italy | May 6, 1938 |
| 380,085 | Italy | Apr. 19, 1940 |
| 906,025 | France | May 7, 1945 |